US011570906B2

(12) United States Patent
Shirakawa et al.

(10) Patent No.: US 11,570,906 B2
(45) Date of Patent: Jan. 31, 2023

(54) MULTI-CORE CABLE ASSEMBLING METHOD AND MULTI-CORE CABLE ASSEMBLY PRODUCING METHOD (71) Applicant: Hitachi Metals, Ltd., Tokyo (JP)

(72) Inventors: Yohei Shirakawa, Tokyo (JP); Yoshitake Ageishi, Tokyo (JP); Kanako Suzuki, Tokyo (JP); Mikio Okoshi, Tokyo (JP)

(73) Assignee: HITACHI METALS, LTD., Tokyo (JP)

( * ) Notice: Subject to any disclaimer, the term of this patent is extended or adjusted under 35 U.S.C. 154(b) by 134 days.

(21) Appl. No.: 17/209,770

(22) Filed: Mar. 23, 2021

(65) Prior Publication Data

US 2021/0307179 A1 Sep. 30, 2021

(30) Foreign Application Priority Data

Mar. 27, 2020 (JP) .............................. JP2020-057396

(51) Int. Cl.
*H05K 3/34* (2006.01)
*H01B 7/00* (2006.01)
*H01B 7/17* (2006.01)
*H01B 13/016* (2006.01)

(52) U.S. Cl.
CPC ......... *H05K 3/3447* (2013.01); *H01B 7/0009* (2013.01); *H01B 7/17* (2013.01); *H01B 13/016* (2013.01)

(58) Field of Classification Search
CPC ...... H05K 3/3447; H05K 3/0005; H05K 1/14; H05K 1/18; H05K 2201/10356; H01B 7/0009; H01B 7/17; H01B 13/016; G06F 30/394; G06F 30/17; G06F 30/39;
(Continued)

(56) References Cited

U.S. PATENT DOCUMENTS

| 4,708,664 | A  | * | 11/1987 | Yard ..................... H01R 13/516 |
| | | | | 29/868 |
| 7,589,536 | B2 | * | 9/2009 | Terlizzi .................. H04L 27/32 |
| | | | | 710/16 |
| 7,923,631 | B2 | * | 4/2011 | Toyama ............... H01B 7/0045 |
| | | | | 174/36 |

FOREIGN PATENT DOCUMENTS

JP     S60-091580 A    5/1985

* cited by examiner

Primary Examiner — Donghai D Nguyen
(74) Attorney, Agent, or Firm — McGinn I.P. Law Group, PLLC.

(57) ABSTRACT

An assembling method for a multi-core cable having a plurality of electrical insulated wires is designed to connect one-end-portions of the electrical insulated wires to electrode patterns, respectively, of one circuit board, correspondingly connect other-end-portions of the electrical insulated wires to electrode patterns, respectively, of the other circuit board, compute intersection coefficients on one end side and the other of the cable, and iterate interchanging connecting destinations for the one-end-portions of the electrical insulated wires, correspondingly interchanging connecting destinations for the other-end-portions of the electrical insulated wires, and computing the intersection coefficients on the one end side and the other of the cable. The connecting destinations for the electrical insulated wires to the electrode patterns are determined in such a manner that a maximum intersection coefficient denoting either larger one of the respective intersection coefficients of the one end side and the other of the cable is made small.

5 Claims, 7 Drawing Sheets (58) Field of Classification Search
CPC ........... G06F 2113/16; Y10T 29/49174; Y10T 29/49194; H04L 27/32; H01R 13/516
USPC .................................................. 29/857, 868
See application file for complete search history.

MULTI-CORE CABLE ASSEMBLING METHOD AND MULTI-CORE CABLE ASSEMBLY PRODUCING METHOD

CROSS-REFERENCE TO RELATED APPLICATION

The present application is based on Japanese patent application No. 2020-057396 filed on Mar. 27, 2020, the entire contents of which are incorporated herein by reference.

BACKGROUND OF THE INVENTION

1. Field of the Invention

The present invention relates to a method for assembling a multi-core cable and a method for producing a multi-core cable assembly.

2. Description of the Related Art

Conventionally, there is known a multi-core cable in which a large number of electrical insulated wires each having an electrical insulating member on a conductor are covered together with a sheath. For example, as a multi-core cable used in a medical probe cable, there is also known one having as many as several tens to several hundreds of electrical insulated wires (coaxial wires or the like). Circuit boards are connected to both ends, respectively, of the multi-core cable, with both the circuit boards being provided with respective pluralities of electrode patterns thereon, which are in correspondence with each other, and the respective corresponding pluralities of electrode patterns of both the circuit boards are electrically connected to each other with any electrical insulated wires, respectively, of the multi-core cable therebetween. The multi-core cable with the circuit boards being provided to both the ends respectively thereof is called a multi-core cable assembly.

Note that there is JPS60-091580A as prior art reference information related to the invention of this application.

[Patent Document 1] JPS60-091580A

SUMMARY OF THE INVENTION

Now, on both the end portions of the multi-core cable, when a plurality of the electrical insulated wires included in the multi-core cable are joined to the pluralities of electrode patterns, respectively, of the circuit boards, intersections between the electrical insulated wires occur. When there occur too many intersections between the electrical insulated wires, the electrical insulated wires become hard and resistant to being bent in the intersection portions caused therebetween and, as a result, the electrical insulated wires are liable to a wire break when subjected to a forced bending. Although the provision of a protective cover or the like to the electrical insulated wires makes it possible to suppress the occurrence of a wire break in the electrical insulated wires, it leads to an increase in cost, and in addition, a constraint on the degree of freedom of wiring of the multi-core cable. For this reason, the number of intersections between the electrical insulated wires is required to be made as small as possible, so as to reduce the risk of occurrence of a wire break.

Note that, on one end portion of the multi-core cable, it is possible to lay out the electrical insulated wires so as to make small the number of intersections between the electrical insulated wires, but that once on the one end portion of the multi-core cable a decision on the connecting destinations (the electrode patterns) for the electrical insulated wires is made, the connecting destinations for the same electrical insulated wires on the other end portion of the multi-core cable are also determined and, as a result, there is concern that, on the other end portion of the multi-core cable, the joining of the same electrical insulated wires to the electrode patterns with there being a very large number of intersections between the same electrical insulated wires may occur. In order to reduce the risk of the occurrence of a wire break described above, the number of intersections between the same electrical insulated wires on both the end portions of the multi-core cable is required to be made small.

In light of the foregoing, it is an object of the present invention to provide a method for assembling a multi-core cable and a method for producing a multi-core cable assembly, which are designed to be able to make small the number of intersections between electrical insulated wires on both end portions of the multi-core cable.

For the purpose of solving the aforementioned problems, the present invention provides a method for assembling a multi-core cable being configured in such a manner as to include a plurality of electrical insulated wires, and a sheath being provided over the plurality of electrical insulated wires together, to connect the plurality of electrical insulated wires to corresponding respective pluralities of electrode patterns of circuit boards on both end portions, respectively, of the multi-core cable, the method comprising: arranging the plurality of electrical insulated wires in alignment with each other on both the end portions of the multi-core cable on a flat surface; connecting respective one end portions of the plurality of electrical insulated wires to the respective plurality of electrode patterns of one of the circuit boards, then correspondingly connecting respective other end portions of the plurality of electrical insulated wires to the respective plurality of electrode patterns of an other of the circuit boards, then calculating with a computer coefficients of intersection for the plurality of electrical insulated wires on one end side and an other end side, respectively, of the multi-core cable; and iterating interchanging connecting destinations for the respective one end portions of the plurality of electrical insulated wires to the respective plurality of electrode patterns, respectively, of the one of the circuit boards, then correspondingly interchanging connecting destinations for the respective other end portions of the plurality of electrical insulated wires to the respective plurality of electrode patterns of the other of the circuit boards, then calculating with the computer the coefficients of intersection for the plurality of electrical insulated wires on the one end side and the other end side, respectively, of the multi-core cable, wherein the connecting destinations for the plurality of electrical insulated wires to the respective pluralities of electrode patterns of the circuit boards are determined with the computer in such a manner that a maximum coefficient of intersection, which refers to either larger one of the respective coefficients of intersection of the one end side and the other end side of the multi-core cable, is made small.

In addition, for the purpose of solving the aforementioned problems, the present invention also provides a method for producing a multi-core cable assembly, which is designed to include a multi-core cable being configured in such a manner as to include a plurality of electrical insulated wires, and a sheath being provided over the plurality of electrical insulated wires together, and circuit boards to be provided on both end portions, respectively, of the multi-core cable, each of the circuit boards having each plurality of electrode patterns thereon to connect with the plurality of electrical insulated wires, respectively, the method comprising: arranging the plurality of electrical insulated wires in alignment with each other on both the end portions of the multi-core cable on a flat surface; connecting respective one end portions of the plurality of electrical insulated wires to the respective plurality of electrode patterns of one of the circuit boards, then correspondingly connecting respective other end portions of the plurality of electrical insulated wires to the respective plurality of electrode patterns of an other of the circuit boards, then calculating with a computer coefficients of intersection for the plurality of electrical insulated wires on one end side and an other end side, respectively, of the multi-core cable; and iterating interchanging connecting destinations for the respective one end portions of the plurality of electrical insulated wires to the respective plurality of electrode patterns of the one of the circuit boards, then correspondingly interchanging connecting destinations for the respective other end portions of the plurality of electrical insulated wires to the respective plurality of electrode patterns of the other of the circuit boards, then calculating with the computer the coefficients of intersection for the plurality of electrical insulated wires on the one end side and the other end side, respectively, of the multi-core cable, wherein the connecting destinations for the plurality of electrical insulated wires to the respective pluralities of electrode patterns of the circuit boards are determined with the computer in such a manner that a maximum coefficient of intersection, which refers to either larger one of the respective coefficients of intersection of the one end side and the other end side of the multi-core cable, is made small.

Points of the Invention

According to the present invention, it is possible to provide the method for assembling the multi-core cable and the method for producing the multi-core cable assembly, which are designed to be able to make small the number of intersections between the electrical insulated wires on both the end portions of the multi-core cable.

DETAILED DESCRIPTION OF THE PREFERRED EMBODIMENTS

Embodiment

An embodiment of the present invention will be described below in conjunction with the accompanying drawings.

(Multi-Core Cable)

Figure 1A:
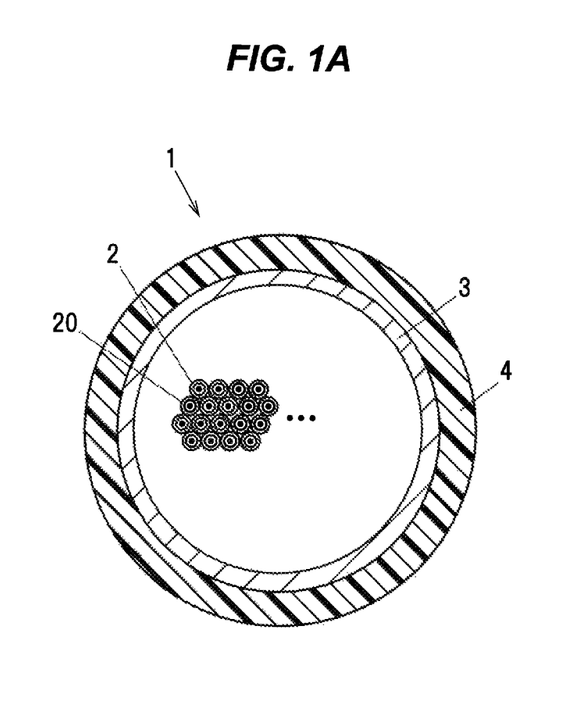
FIG. 1A is a cross-sectional view schematically showing a cross section perpendicular to a longitudinal direction of a multi-core cable.
Figure 1B:
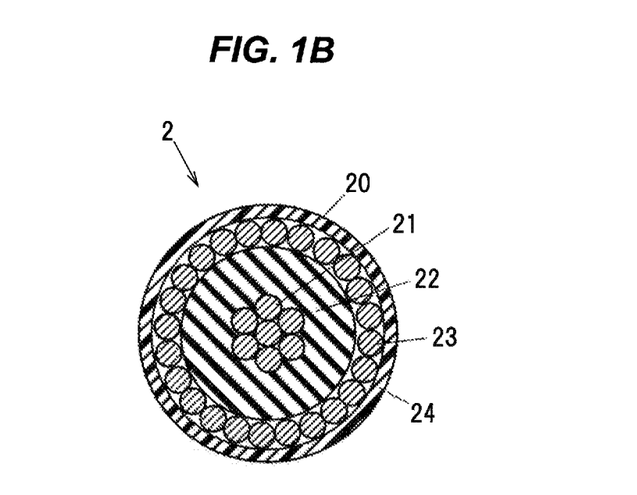
FIG. 1B is a cross-sectional view showing a cross section perpendicular to a longitudinal direction of an electrical insulated wire.

FIG. 1A is a cross-sectional view schematically showing a cross section perpendicular to a longitudinal direction of a multi-core cable, and FIG. 1B is a cross-sectional view showing a cross section perpendicular to a longitudinal direction of an electrical insulated wire.

As shown in FIGS. 1A and 1B, the multi-core cable 1 includes a plurality of electrical insulated wires 2, and a sheath 4, which is provided over the plurality of electrical insulated wires 2 together. In the present embodiment, the plurality of electrical insulated wires 2 are stranded together, and a shielding layer 3 made of a braided shield is provided in such a manner as to cover a periphery of the plurality of electrical insulated wires 2, and the sheath 4 is provided in such a manner as to coat a periphery of the shielding layer 3. The multi-core cable 1 is configured to be used in a medical probe cable, for example.

In the above multi-core cable 1, for each of the plurality of electrical insulated wires 2, each coaxial wire 20 includes respective inner conductors 21, each electrical insulating member 22, respective outer conductors 23, and each outer skin 24, which in turn are provided over an outer periphery of the respective inner conductors 21. It should be noted, however, that the plurality of electrical insulated wires 2 are not limited to the aforementioned coaxial wires 20, but the plurality of electrical insulated wires 2 may have no outer conductors 23 or no outer skin 24. The outer diameters of the coaxial wires 20 used for the plurality of electrical insulated wires 2 are e.g., from 0.2 mm to 0.5 mm.

The number of electrical insulated wires 2 in the multi-core cable 1 is not particularly limited, but the present invention can be applied to the multi-core cable 1 having three or more of the electrical insulated wires 2. In the present embodiment, the number of electrical insulated wires 2 included in one multi-core cable 1 is on the order of from 10 to 300, for example (Multi-Core Cable Assembly)

Figure 2:
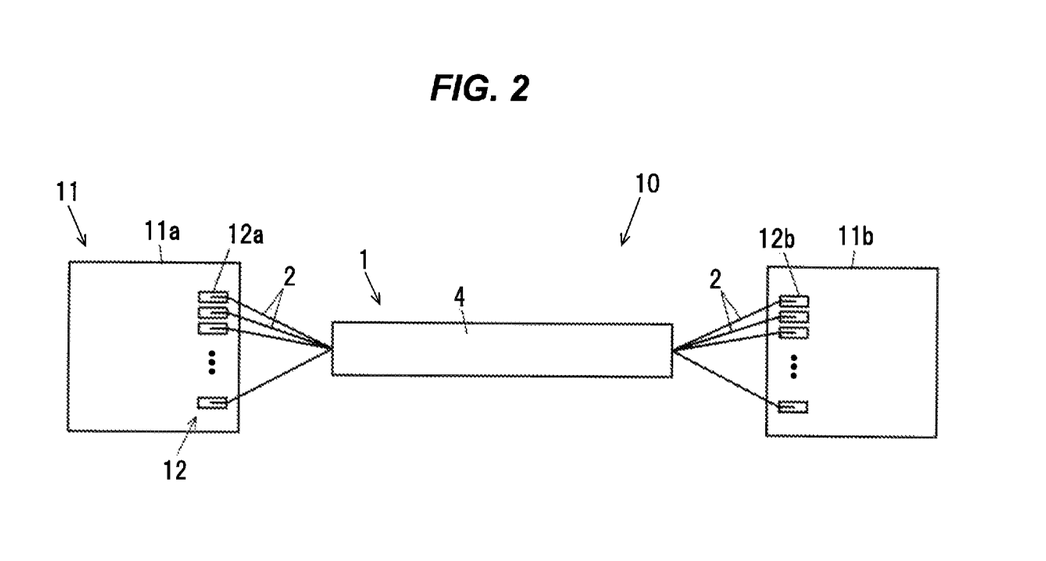
FIG. 2 is a schematic configuration diagram for a multi-core cable assembly.

FIG. 2 is a schematic configuration diagram for a multi-core cable assembly. As shown in FIG. 2, the multi-core cable assembly 10 includes the multi-core cable 1, and two circuit boards 11, which are provided to both end portions, respectively, of the multi-core cable 1.

The two circuit boards 11 are, for example, an internal substrate of a sensor portion or a connector portion or the like. Hereinafter, the circuit board 11 being provided to one end side (to the left side in FIG. 2) of the multi-core cable 1 will also be referred to as the first circuit board 11a, while the circuit board 11 being provided to the other end side (to the right side in FIG. 2) of the multi-core cable 1 will also be referred to as the second circuit board 11b.

On each of the first and the second circuit boards 11a and 11b, each plurality of electrode patterns 12 to which the plurality of electrical insulated wires 2, respectively, included in the multi-core cable 1 are connected are provided in alignment with each other. Hereinafter, the respective plurality of electrode patterns 12 being provided on the first circuit board 11a will also be referred to as the first plurality of electrode patterns 12a, while the respective plurality of electrode patterns 12 being provided on the second circuit board 11b will also be referred to as the second plurality of electrode patterns 12b. The first plurality of electrode patterns 12a and the second plurality of electrode patterns 12b are in a one-to-one correspondence, and the first plurality of electrode patterns 12a and the second plurality of electrode patterns 12b being in correspondence with each other are electrically connected to each other with any electrical insulated wires 2 respectively therebetween.

It should be noted the number of the first circuit board(s) 11a is not limited to one as shown in FIG. 2, and two or more first circuit boards 11a may be provided. When the plurality of first circuit boards 11a are provided, the plurality of first electrode patterns 12a are provided in a distributed arrangement in the first circuit boards 11a. The same configuration is applicable to the second circuit boards 11b and the second electrode patterns 12b.

(Producing Method for the Multi-Core Cable Assembly 10)

Figure 3:
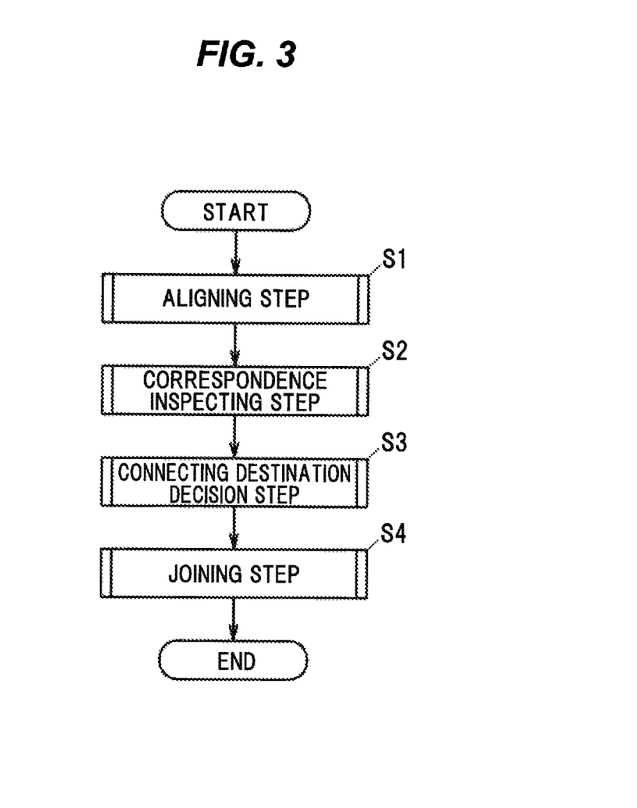
FIG. 3 is a flow chart showing a procedure for a producing method for the multi-core cable assembly.
Figure 4:
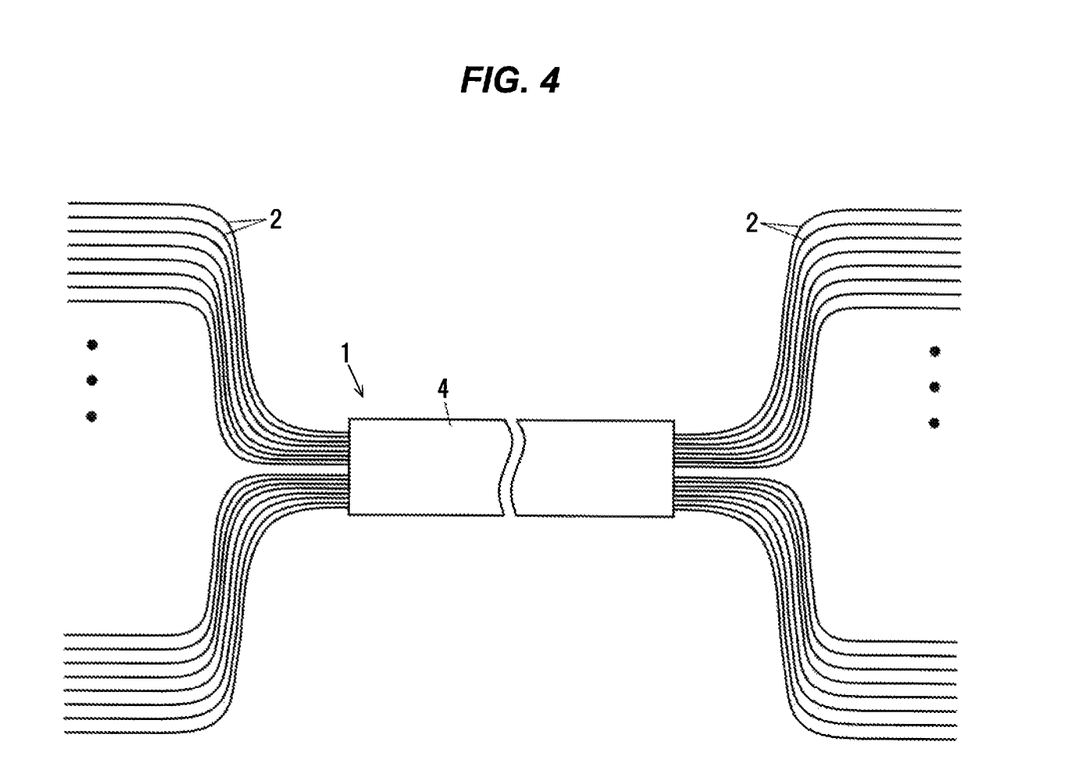
FIG. 4 is a diagram for explaining an aligning step.

FIG. 3 is a flow chart showing a procedure for a producing method for the multi-core cable assembly 10. As shown in FIG. 3, in producing the multi-core cable assembly 10, first, an aligning step is executed in step S1. In the aligning step, on each of both the end portions of the preliminarily fabricated multi-core cable 1, the sheath 4 with a predetermined length and the shielding layer 3 with a predetermined length are removed from each of the end portions to expose the plurality of electrical insulated wires 2 under the shielding layer 3, and the plurality of exposed electrical insulated wires 2 are arranged in alignment with each other on a flat surface. At this point of time, as shown in FIG. 4, by using a comb shaped jig or the like, the plurality of electrical insulated wires 2 are untangled, and are arranged in alignment with each other on the flat surface (for example, on an inspection bench) in such a manner that the number of intersections between the electrical insulated wires 2 is made as small as possible (in such a manner that the coefficient of intersection k for the electrical insulated wires 2, which will be described later, is a minimum). Note that, at this point of time, a treatment (a terminal stripping treatment) for exposing the respective inner conductors 21 in terminals of the plurality of electrical insulated wires 2 and the like may be carried out.

After that, in step S2, a correspondence inspecting step is executed. In the correspondence inspecting step, a relationship of correspondences between the respective end portions of the electrical insulated wires 2 is inspected. This is because, in the multi-core cable 1 having a large number of electrical insulated wires 2, for all the electrical insulated wires 2, it is difficult to make the identification colors of their respective outer skins 24 different from each other, and in addition, because when the electrical insulated wires 2 are stranded together in the interior of the multi-core cable 1, the positional relationships between the electrical insulated wires 2 are also not constant. In the present embodiment, the method for inspecting the relationship of correspondences between the respective end portions of the electrical insulated wires 2 in the correspondence inspecting step is not particularly limited, but, for example, it is possible to use the method designed to input an inspection signal to respective one end portions of any electrical insulated wires 2, and measure voltages output from the electrical insulated wires 2, respectively, at the other end portion of the multi-core cable 1, or the like.

After that, in step S3, a connecting destination decision step is executed. In the connecting destination decision step, on each of both the end portions of the multi-core cable 1, a decision on the respective plurality of electrode patterns 12 for the connecting destinations for the plurality of electrical insulated wires 2 is made. In the present embodiment, at this point of time, on each of both the end portions of the multi-core cable 1, a decision on the respective plurality of electrode patterns 12 for the connecting destinations for the plurality of electrical insulated wires 2 is made, in such a manner that the coefficients of intersection k for the electrical insulated wires 2 are made as small as possible. The details of the connecting destination decision step will be described later.

After that, in step S4, a joining step is executed. In the joining step, the plurality of electrical insulated wires 2 are joined by soldering or the like to the respective plurality of electrode patterns 12 for the connecting destinations, respectively, on which the aforementioned connecting destination decision has been made in step S3. This results in the multi-core cable assembly 10 shown in FIG. 2.

(Connection Destination Decision Step)

Figure 5:
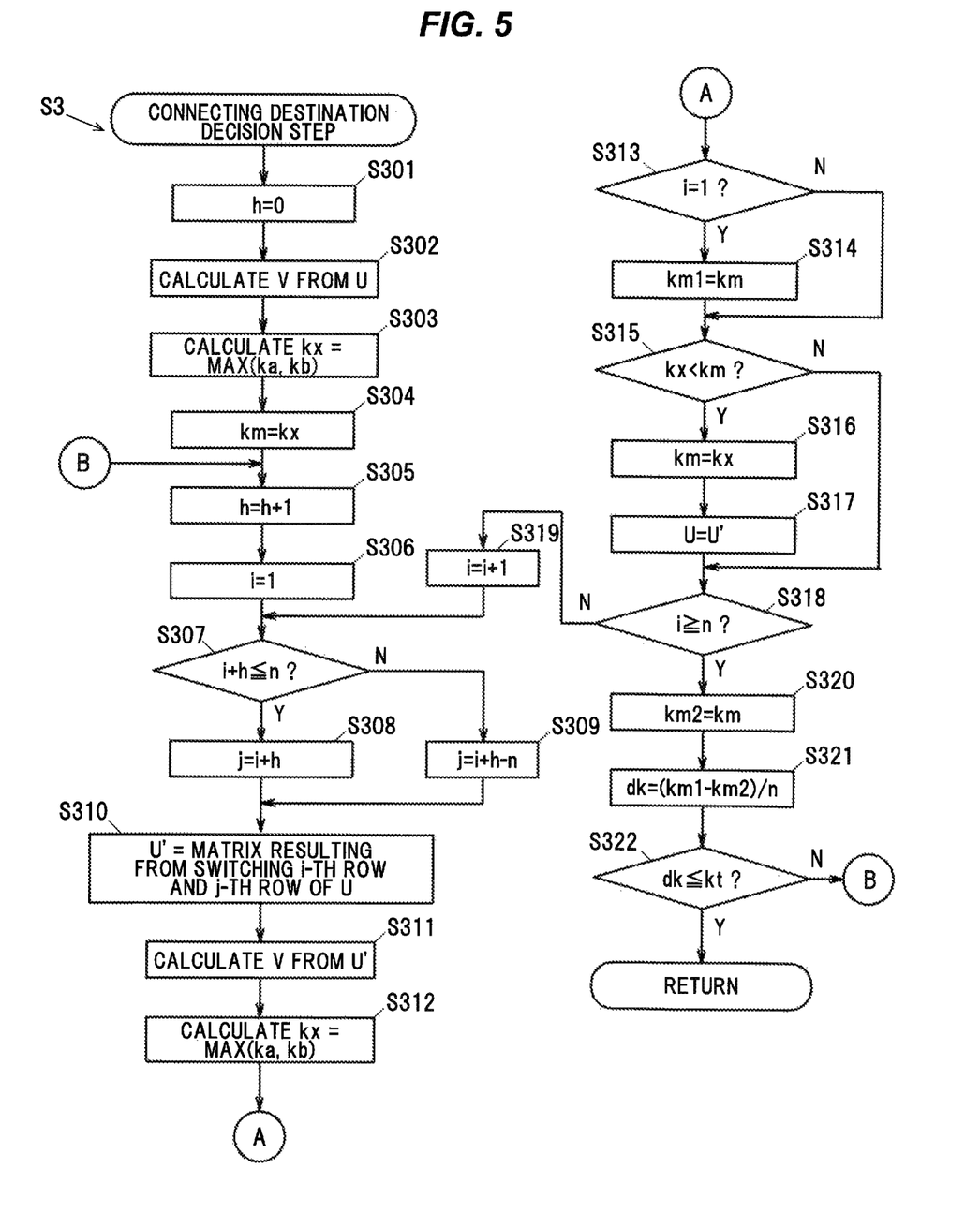
FIG. 5 is a flow chart for a connecting destination decision step.

FIG. 5 is a flow chart for the connecting destination decision step with a computer. A method for assembling the multi-core cable 1 according to the present embodiment is configured to connect respective one end portions of the plurality of electrical insulated wires 2 to the first plurality of electrode patterns 12a, respectively, on the first circuit board 11a, then correspondingly connect the respective other end portions of the plurality of electrical insulated wires 2 to the second plurality of electrode patterns 12b, respectively, on the second circuit board 11b, then calculate with the computer the coefficients of intersection k for the plurality of electrical insulated wires 2 in a plan view on the one end side and the other end side, respectively, of the multi-core cable 1, and to iterate interchanging the connecting destinations for the respective one end portions of the plurality of electrical insulated wires 2 to the first plurality of electrode patterns 12a, respectively, then correspondingly interchanging the connecting destinations for the respective other end portions of the plurality of electrical insulated wires 2 to the second plurality of electrode patterns 12b respectively, then calculating with the computer the coefficients of intersection k for the plurality of electrical insulated wires 2 on the one end side and the other end side, respectively, of the multi-core cable 1. In doing so, the connecting destinations for the plurality of electrical insulated wires 2 to the first plurality of electrode patterns 12a, respectively, and the second plurality of electrode patterns 12b respectively are determined with the computer, in such a manner that a maximum coefficient of intersection kx, which refers to either larger one of the respective coefficients of intersection k of the one end side and the other end side of the multi-core cable 1, is made small.

This makes it possible to make small the coefficients of intersection k on both the end portions, respectively, of the multi-core cable 1 in a balanced manner while suppressing the number of intersections between the electrical insulated wires 2 from becoming larger on either one of the end portions of the multi-core cable 1, for example. As a result, it is possible to suppress the plurality of electrical insulated wires 2 from becoming hard and resistant to being bent in the intersection portions caused therebetween and being liable to a wire break, and it is possible to thereby reduce the risk of the occurrence of a wire break in the plurality of electrical insulated wires 2. Note that, for example, it is conceivable that the connecting destinations for the plurality of electrical insulated wires 2 are determined in such a manner that the respective coefficients of intersection k of the one end side and the other end side of the multi-core cable 1 are made small, but that in this case, there is concern that one of the respective coefficients of intersection k may become large on either one of the end portions of the multi-core cable 1, leading to difficulty in sufficiently reducing the risk of the occurrence of a wire break in the plurality of electrical insulated wires 2.

In the present embodiment, the coefficients of intersection k are used as an index to evaluate the intersections between the electrical insulated wires 2. That is, in the method for assembling the multi-core cable 1 according to the present embodiment, the connecting destinations for the plurality of electrical insulated wires 2 to the respective plurality of electrode patterns 12 of each of the circuit boards 11 are determined with the computer in such a manner that a maximum coefficient of intersection kx, which is either larger one of the respective coefficients of intersection k of the one end side and the other end side of the multi-core cable 1, is made small. Hereinafter, the details of the procedure for the connecting destination decision step, and the method for obtaining the coefficients of intersection will be described. Further, in the following description, the side of the multi-core cable 1 to be connected to the first plurality of electrode patterns 12a of the first circuit board 11a will also be referred to as the one end portion of the multi-core cable 1, while the side of the multi-core cable 1 to be connected to the second plurality of electrode patterns 12b of the second circuit board 11b will also be referred to as the other end portion of the multi-core cable 1.

As shown in FIG. 5, first, in step S301, a variable h is set as an initial value 0 (zero). After that, in step S302, a matrix U, which denotes a state of connections between the plurality of electrical insulated wires 2 and the plurality of electrode patterns 12a on the one end portion of the multi-core cable 1 in the initial state (the state in which the coefficient of intersection on the one end portion of the multi-core cable 1 becomes a minimum), is input to the computer. A matrix S, which denotes a relationship of correspondences between the respective one end portions and the respective other end portions of the plurality of electrical insulated wires 2 obtained in step S2 shown in FIG. 3, is input to the computer. A matrix T, which denotes a relationship of correspondences between the first plurality of electrode patterns 12a to which the respective one end portions of the plurality of electrical insulated wires 2 respectively are to be connected and the second plurality of electrode patterns 12b to which the respective other end portions of the electrical insulated wires 2 respectively are to be connected, is input to the computer. A matrix V (=TUS$^{-1}$), which denotes a state of connections between the plurality of electrical insulated wires 2 and the plurality of electrode patterns 12b on the other end portion of the multi-core cable 1, is calculated with the computer, on the basis of the matrix U, the matrix S, and the matrix T.

Figure 6A:
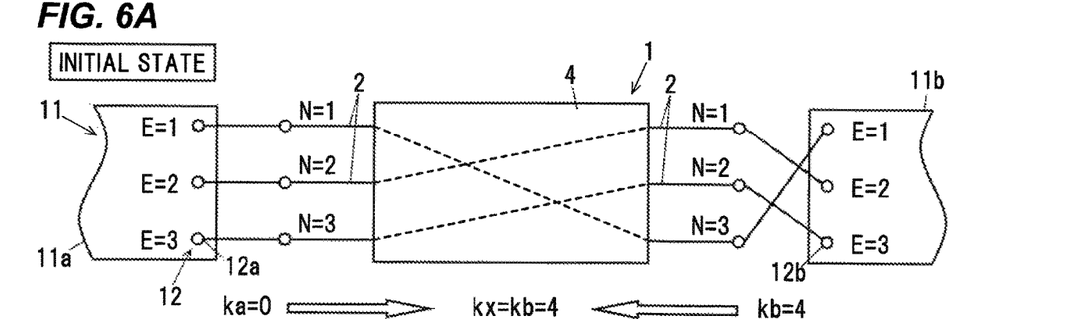
FIGS. 6A to 6D are diagrams for explaining the connecting destination decision step.

One example is given. As shown in FIG. 6A, a case where the multi-core cable 1 having the three electrical insulated wires 2 is used and connected to the circuit boards 11 each having the respective three electrode patterns 12 on each of both the end portions of the multi-core cable 1 will be described. In the aligning step in step S1 shown in FIG. 3, a laying out order for the plurality of electrical insulated wires 2 in a state of being arranged in alignment with each other on a flat surface is expressed in terms of electric wire numbers N, while a laying out order for the respective plurality of electrode patterns 12 of each of the circuit boards 11 is expressed in terms of electrode numbers E. The electric wire numbers N and the electrode numbers E are assigned in ascending order from one side in the laid-out direction to the other side (in FIGS. 6A to 6D, from the upper side to the lower side). Herein, it is assumed that the three first electrode patterns 12a and the three second electrode patterns 12b, to which the same electrode numbers E respectively are assigned, are in correspondence with each other, while the respective one end portions of the three electrical insulated wires 2 of the electric wire numbers N=1, 2, and 3 on the one end side of the multi-core cable 1 are in correspondence with the respective other end portions of the electrical insulated wires 2 of the electric wire numbers N=3, 1 and 2, respectively, on the other end side of the multi-core cable 1. Note that the relationship of correspondences between the respective end portions of the plurality of electrical insulated wires 2 is inspected in the correspondence inspecting step in step S2 shown in FIG. 3.

In the example shown in FIG. 6A, on the one end portion of the multi-core cable 1, when the three electrical insulated wires 2 of the electric wire numbers N=1, 2, and 3 are connected to the three first electrode patterns 12a of the electrode numbers E=1, 2, and 3 respectively, the coefficient of intersection on the one end portion of the multi-core cable 1 becomes the minimum. The connecting destinations for the three electrical insulated wires 2 on the other end portion of the multi-core cable 1 are obtained in such a manner as to correspond to the three first electrode patterns 12a of the electrode numbers E=1, 2, and 3, respectively, being the connecting destinations for the three electrical insulated wires 2 of the electric wire numbers N=1, 2, and 3, respectively, on the one end portion of the multi-core cable 1, so that the connections between the three second electrode patterns 12b and the three first electrode patterns 12a which are the same in the electrode numbers E respectively are made.

In the example shown in FIG. 6A, the matrix U denoting the state of connections between the three electrical insulated wires 2 and the three first electrode patterns 12a on the one end side of the multi-core cable 1, and the matrix V denoting the state of connections between the three electrical insulated wires 2 and the three second electrode patterns 12b on the other end side of the multi-core cable 1, can be represented by [Formula 1] below. Note that in the depicted example, the inverse matrix S$^{-1}$ of the matrix S, and the matrix T can be represented by [Formula 2] below.

$$U = \begin{pmatrix} 1 & 0 & 0 \\ 0 & 1 & 0 \\ 0 & 0 & 1 \end{pmatrix} \quad V = \begin{pmatrix} 0 & 1 & 0 \\ 0 & 0 & 1 \\ 1 & 0 & 0 \end{pmatrix} \quad \text{[Formula 1]}$$

$$S^{-1} = \begin{pmatrix} 0 & 0 & 1 \\ 1 & 0 & 0 \\ 0 & 1 & 0 \end{pmatrix} \quad T = \begin{pmatrix} 1 & 0 & 0 \\ 0 & 1 & 0 \\ 0 & 0 & 1 \end{pmatrix} \quad \text{[Formula 2]}$$

A matrix for the electric wire numbers N and a matrix for the electrode numbers E are represented by [Formula 3] below.

$$N = \begin{pmatrix} N(1) \\ N(2) \\ N(3) \end{pmatrix} \quad E = \begin{pmatrix} E(1) \\ E(2) \\ E(3) \end{pmatrix} \quad \text{[Formula 3]}$$

For the matrices U and V and the matrices N and E, the following equations hold.

$$E = U \times N$$

$$E = V \times N$$

From the above equations, it is possible to know the states of connections between the plurality of electrical insulated wires 2 and the respective pluralities of electrode patterns 12 (that is, the relationships of correspondences between the electric wire numbers N and the electrode numbers E being connected to each other) on the one end portion and the other end portion of the multi-core cable 1.

After that, in step S303, the maximum coefficient of intersection kx in the initial state is obtained. Hereinafter, the coefficient of intersection k on the one end side of the multi-core cable 1 will also be referred to as ka, while the coefficient of intersection k on the other end side of the multi-core cable 1 will also be referred to as kb. In step S303, first, the coefficients of intersection k (ka and kb) on both the end portions of the multi-core cable 1 are obtained. The coefficients of intersection k can be obtained by adding |E−N| together for all of the plurality of electrical insulated wires 2. That is, the coefficients of intersection k can be obtained according to the following equation.

$$k=\Sigma(|E-N|)$$

In the example shown in FIG. 6A, the coefficient of intersection ka on the one end portion of the multi-core cable 1 is 0 according to the following equation.

$$ka=|1-1|+|2-2|+|3-3|=0$$

Further, the coefficient of intersection kb on the other end portion of the multi-core cable 1 is 4 according to the following equation.

$$kb=|1-3|+|2-1|+|3-2|=4$$

After that, of the obtained coefficients of intersection ka and kb in the initial state, whichever is larger is stored as the maximum coefficient of intersection kx. In the example shown in FIG. 6A, it follows that the maximum coefficient of intersection kx in the initial state is kx=kb=4.

After that, in step S304, the maximum coefficient of intersection kx is assigned to km as the initial value, where the km refers to a minimum value for the maximum coefficient of intersection kx. After that, in step S305, the variable h is incremented, and in step S306, 1 is assigned to a variable i.

After that, in step S307, a decision is made as to whether i+h is equal to or smaller than n, the number of electrical insulated wires 2. If a YES decision is made in step S307, then in step S308, the i+h is assigned to a variable j, and the flow progresses to step S310. If a NO decision is made in step S307, then in step S309, i+h−n is assigned to the variable j, and the flow progresses to step S310.

Figure 6B:
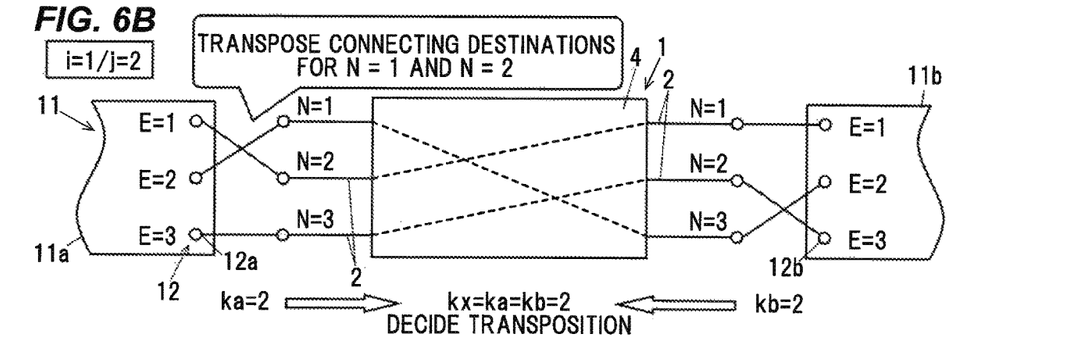

In step S310, a matrix U' resulting from switching the i-th row and the j-th row of the matrix U is obtained. That is, the matrix U' is obtained that represents a state where the connecting destinations for the i-th electrical insulated wire 2 whose electric wire number N is the i-th and the j-th electrical insulated wire 2 whose electric wire number N is the j-th have been transposed. After that, in step S311, a matrix V (=TU'S$^{-1}$), which corresponds to the matrix U', is calculated. Specifically, when the variables i=1 and j=2 (h=1), as shown in FIG. 6B, on the one end portion of the multi-core cable 1, the connecting destination for the electric wire number 1 is transposed into the electrode number 2 while the connecting destination for the electric wire number 2 is transposed into the electrode number 1, and on the other end portion of the multi-core cable 1, the connecting destination for the electric wire number 3 is correspondingly transposed into the electrode number 2 while the connecting destination for the electric wire number 1 is correspondingly transposed into the electrode number 1, and the connecting destination for the electric wire number 2 is correspondingly transposed into the electrode number 3. From the foregoing, it follows that the matrices U' and V (=TU'S$^{-1}$) are represented by [Formula 4] below.

$$U' = \begin{pmatrix} 0 & 1 & 0 \\ 1 & 0 & 0 \\ 0 & 0 & 1 \end{pmatrix} \quad V = \begin{pmatrix} 1 & 0 & 0 \\ 0 & 0 & 1 \\ 0 & 1 & 0 \end{pmatrix} \qquad \text{[Formula 4]}$$

After that, in step S312, the coefficients of intersection ka and kb in the states represented by the matrices U' and V are obtained, and the maximum coefficient of intersection kx is obtained. In the case shown in FIG. 6B, the coefficient of intersection ka is 2 according to the following equation.

$$ka=|1-2|+|2-1|+|3-3|=2$$

Likewise, the coefficient of intersection kb is 2 according to the following equation.

$$kb=|1-1|+|2-3|+|3-2|=2$$

Hence, the maximum coefficient of intersection kx is kx=ka=kb=2.

After that, in step S313, a decision is made as to whether the variable i is 1. If a YES decision is made in step S313, then in step S314, the current minimum value km (the minimum value for the maximum coefficient of intersection kx) is assigned to a variable km1, and the flow progresses to step S315. If a NO decision is made in step S313 for the variable km1 to be used in obtaining the rate of change of the maximum coefficient of intersection kx in step S321, which will be described later, then step S314 is skipped and the flow progresses to step S315.

In step S315, a decision is made as to whether the maximum coefficient of intersection kx calculated in step S312 is smaller than the current minimum value km (the minimum value for the maximum coefficient of intersection kx). If a YES decision is made in step S315, then in step S316, the maximum coefficient of intersection kx calculated in step S312 is assigned to the km to update the minimum value km, and in step S317, the matrix U' is substituted into the matrix U to update the connecting destinations for the electrical insulated wires 2 on the one end portion of the multi-core cable 1. That is, a decision is made to transpose the connecting destinations for the electrical insulated wires 2 on the one end portion of the multi-core cable 1. In the subsequent processing, from the state in which the connecting destinations for the electrical insulated wires 2 have been updated, the transposition of the connecting destinations is carried out. In the example shown in FIG. 6B, since the current minimum value km=4 and the calculated maximum coefficient of intersection kx=2, the minimum value km is updated with 2, and the transposition of the above connecting destinations is determined to be the state shown in FIG. 6B. After that, the flow progresses to step S318. If a NO decision is made in step S315, then the flow progresses to step S318 without carrying out the updating of the minimum value km and the matrix U. In this case, the transposition (the matrix U') of the above connecting destinations in step S310 is not reflected, but the state of connections (the matrix U) before the transposition of the above connecting destinations in step S310 is maintained.

Figure 6C:
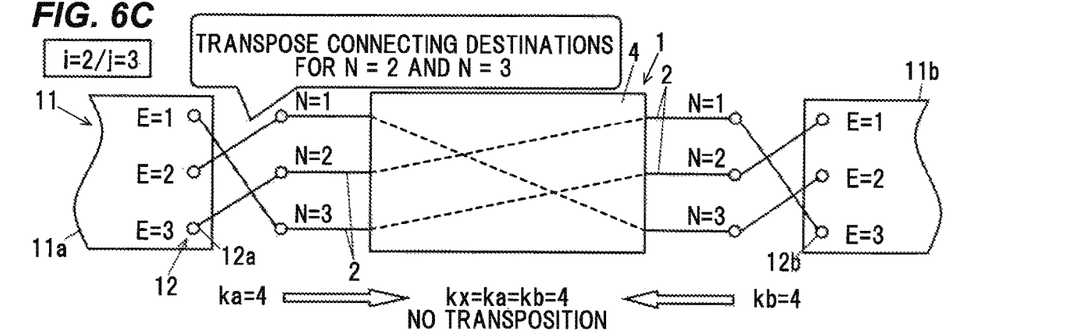

In step S318, a decision is made as to whether the variable i is equal to or greater than n, the number of electrical insulated wires 2. If a NO decision is made in step S318, then in step S319, the variable i is incremented, and thereafter the flow returns to step S307. In the loop from the second time step S307 onward, the variables i=2 and j=3, and in step S310, a matrix U' resulting from switching the second row and the third row in the current matrix U is created. The state of connections at this point of time is the state of connections as shown in FIG. 6C, and the matrix U' and the corresponding matrix V (=TU'S$^{-1}$) are those represented by [Formula 5] below.

$$U' = \begin{pmatrix} 0 & 0 & 1 \\ 1 & 0 & 0 \\ 0 & 1 & 0 \end{pmatrix} \quad V = \begin{pmatrix} 0 & 1 & 0 \\ 0 & 0 & 1 \\ 1 & 0 & 0 \end{pmatrix} \quad \text{[Formula 5]}$$

At this point of time, since the maximum coefficient of intersection kx obtained in step S312 is 4, which is not smaller than the current minimum value km=2, no updating of the minimum value km and the matrix U is carried out.

Figure 6D:
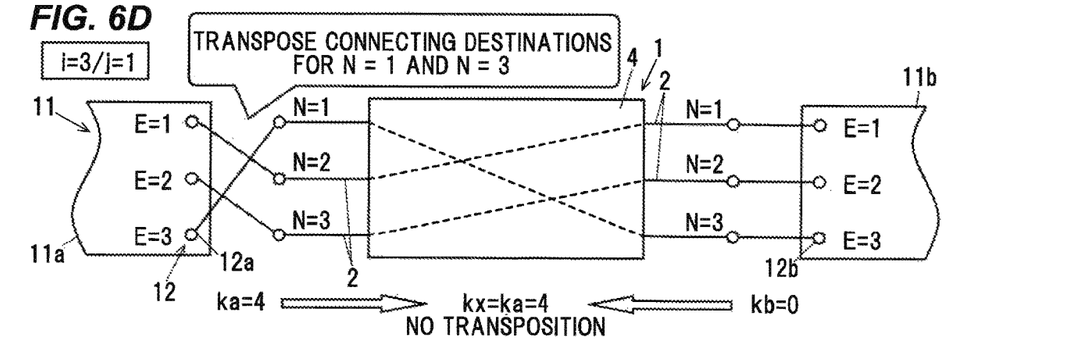

After that, in the loop from the third time step S307 onward, the variables i=3 and j=1, and in step S310, a matrix U' resulting from switching the third row and the first row in the current matrix U is created. The state of connections at this point of time is the state of connections as shown in FIG. 6D, and the matrix U' and the corresponding matrix V (=TU'S$^{-1}$) are those represented by [Formula 6] below.

$$U' = \begin{pmatrix} 0 & 1 & 0 \\ 0 & 0 & 1 \\ 1 & 0 & 0 \end{pmatrix} \quad V = \begin{pmatrix} 1 & 0 & 0 \\ 0 & 1 & 0 \\ 0 & 0 & 1 \end{pmatrix} \quad \text{[Formula 6]}$$

At this point of time, since the maximum coefficient of intersection kx obtained in step S312 is 4, which is not smaller than the current minimum value km=2, no updating of the minimum value km and the matrix U is carried out.

If a YES decision is made in step S318, then in step S320, the current minimum value km (the minimum value for the maximum coefficient of intersection kx) is assigned to a variable km2. After that, in step S321, the rate of change dk of the maximum coefficient of intersection kx is obtained according to the following equation where n is the number of electrical insulated wires 2.

$$dk=(km1-km2)/n$$

After that, in step S322, a decision is made as to whether the resulting rate of change dk is equal to or smaller than a preset threshold value kt for the rate of change. If a NO decision is made in step S322, then the flow returns to step S305, and in step S305, the variable h is incremented, and steps S306 to S322 are repeated. If a YES decision is made in step S322, that is, if the rate of change dk is equal to or smaller than the preset threshold value kt for the rate of change, then the connecting destinations for the plurality of electrical insulated wires 2 at the point of time are determined to be the respective pluralities of electrode patterns 12 for the final connecting destinations for the plurality of electrical insulated wires 2, respectively, on the one end portion and the other end portion of the multi-core cable 1, and the flow returns (progresses to step S4 in FIG. 3). Note that it follows that steps S321 and S322 serve as the steps of making a decision on the convergence of the maximum coefficient of intersection kx. Since the iteration of the aforementioned computation exhibits a tendency to allow the coefficient of intersection km to converge to a certain value and not to become any lower than the value, if it is determined that the coefficient of intersection km has converged, then at the point of time, the connecting destinations for the plurality of electrical insulated wires 2 (the respective pluralities of electrode patterns 12 to which the plurality of electrical insulated wires 2, respectively, are connected, on both the end portions of the multi-core cable 1), are determined to be the final connecting destinations therefor.

In the aforementioned manner, the method for assembling the multi-core cable 1 according to the present embodiment is configured in such a manner as to include sequentially iterating the steps (the loop of steps S307 to S318) of, on the one end side of the multi-core cable 1, transposing the connecting destinations for the i-th electrical insulated wire 2 whose electric wire number N is the i-th and the j-th electrical insulated wire 2 whose electric wire number N is the j-th represented by the following equations:

$$j=i+h(\text{when } i+h\leq n)$$

$$j=i+h-n(\text{when } i+h>n),$$

where h is a variable, and n is the number of electrical insulated wires 2, obtaining the maximum coefficient of intersection kx in the state of the transposition of the connecting destinations, and when the obtained maximum coefficient of intersection kx is small as compared with before the transposition of the connecting destinations, making a decision to transpose the connecting destinations. In the method for assembling the multi-core cable 1 according to the present embodiment, on both the end portions of the multi-core cable 1, the respective pluralities of electrode patterns 12 for the connecting destinations for the plurality of electrical insulated wires 2 are determined by iterating the above steps while incrementing the variable h sequentially from 1.

In addition, in the present embodiment, when the rate of change dk of the maximum coefficient of intersection kx before and after the above mentioned steps (the loop of steps S307 to S318) becomes equal to or smaller than the preset threshold value kt for the rate of change, the connecting destinations for the plurality of electrical insulated wires 2 at the point of time on both the end portions of the multi-core cable 1 are determined to be the respective pluralities of electrode patterns 12 for the final connecting destinations for the plurality of electrical insulated wires 2.

(Verification of the Intersection Suppressing Effect by Making the Coefficients of Intersection k Small)

Figure 7A:
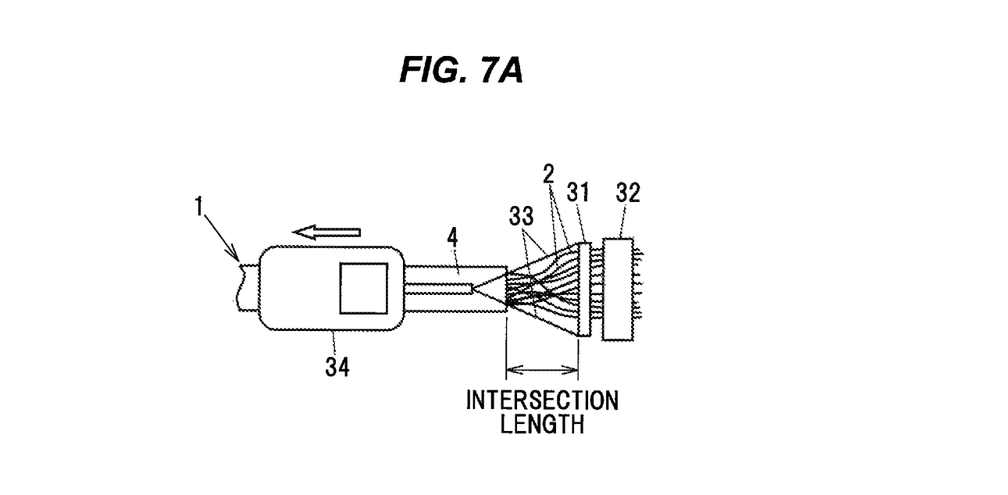
FIG. 7A is a diagram for explaining a measurement of an intersection length.

As shown in FIG. 7A, a measurement of an intersection length has been made by using a jig 31 having a plurality of holes through which the plurality of electrical insulated wires 2, respectively, of the multi-core cable 1 are to be passed. The intersection length has been defined as the distance from an end portion of the sheath 4 of the multi-core cable 1 to the jig 31. The measurements have been taken by passing the plurality of electrical insulated wires 2 through the plurality of holes, respectively, of the jig 31, fixing the electrical insulated wires 2 passed through the jig 31 with a fixing jig 32, connecting a tension meter 34 to the jig 31 with a wire 33 therebetween, and pulling the jig 31 to its base end side (sheath 4 side) at a load of 1 kg with the tension meter 34. The measurements of the intersection length have been taken by setting the number of electrical insulated wires 2 at 128, and varying the coefficient of intersection k for the plurality of electrical insulated wires 2. The results of the measurements have been shown in FIG. 7B.

Figure 7B:
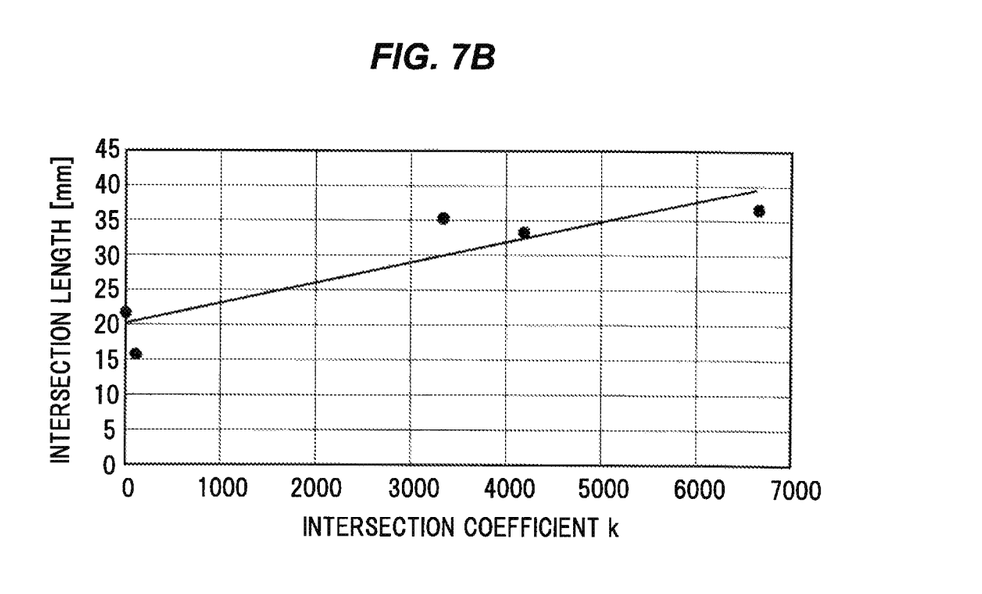
FIG. 7B is a graph showing a relationship between the intersection coefficient and the intersection length.

As shown in FIG. 7B, it has been confirmed that the smaller the coefficient of intersection k, the shorter the intersection length, and that the occurrence of the intersections between the electrical insulated wires 2 has been able to be suppressed by making the coefficient of intersection k small. Note that the correlation coefficient between the coefficient of intersection k and the intersection length has been 0.9.

(Comparison with Random Search)

In the present embodiment, as described above, the method for assembling the multi-core cable 1 is configured in such a manner as to include sequentially iterating the steps of obtaining the maximum coefficient of intersection kx in the initial state in which the coefficient of intersection k on the one end side of the multi-core cable 1 is a minimum, thereafter on the one end side of the multi-core cable 1, transposing two of the plurality of electrode patterns 12 for the two connecting destinations for any first electrical insulated wire 2 of the plurality of electrical insulated wires 2 and a second electrical insulated wire 2 thereof whose electric wire number differs from that of the first electrical insulated wire 2 by the variable h, obtaining the maximum coefficient of intersection kx in the state of the transposition of the two connecting destinations, and when the obtained maximum coefficient of intersection kx is small as compared with before the transposition of the two connecting destinations, making a decision to transpose the two connecting destinations. In the present embodiment, on both the end portions of the multi-core cable 1, the respective pluralities of electrode patterns 12 for the connecting destinations for the plurality of electrical insulated wires 2 are determined by iterating the above steps while incrementing the variable h sequentially from 1. This allows the maximum coefficient of intersection kx to be made small by a smaller number of searches. Note that the number of searches is defined as the number of times that the maximum coefficient of intersection kx has been obtained.

It should be noted, however, that the present invention is not limited to the above, but that, for example, it is also possible to iterate randomly determining the connecting destinations for the plurality of electrical insulated wires 2 on the one end side of the multi-core cable 1, and obtaining the maximum coefficient of intersection kx, and determine the connecting destinations for the plurality of electrical insulated wires 2 to have the smaller maximum coefficient of intersection kx. Hereinafter, this searching method will also be referred to as the random search.

For Example 1 according to the present embodiment in which the connecting destinations for the plurality of electrical insulated wires 2 were determined in accordance with the flow chart shown in FIG. 5, and Examples 2, 3, and 4 in which the connecting destinations for the plurality of electrical insulated wires 2 were determined in accordance with the random search, respective changes in the maximum coefficient of intersection kx against the number of searches were investigated. The number n of the electrical insulated wires 2 was 128. The results were shown in FIG. 8.

Figure 8:
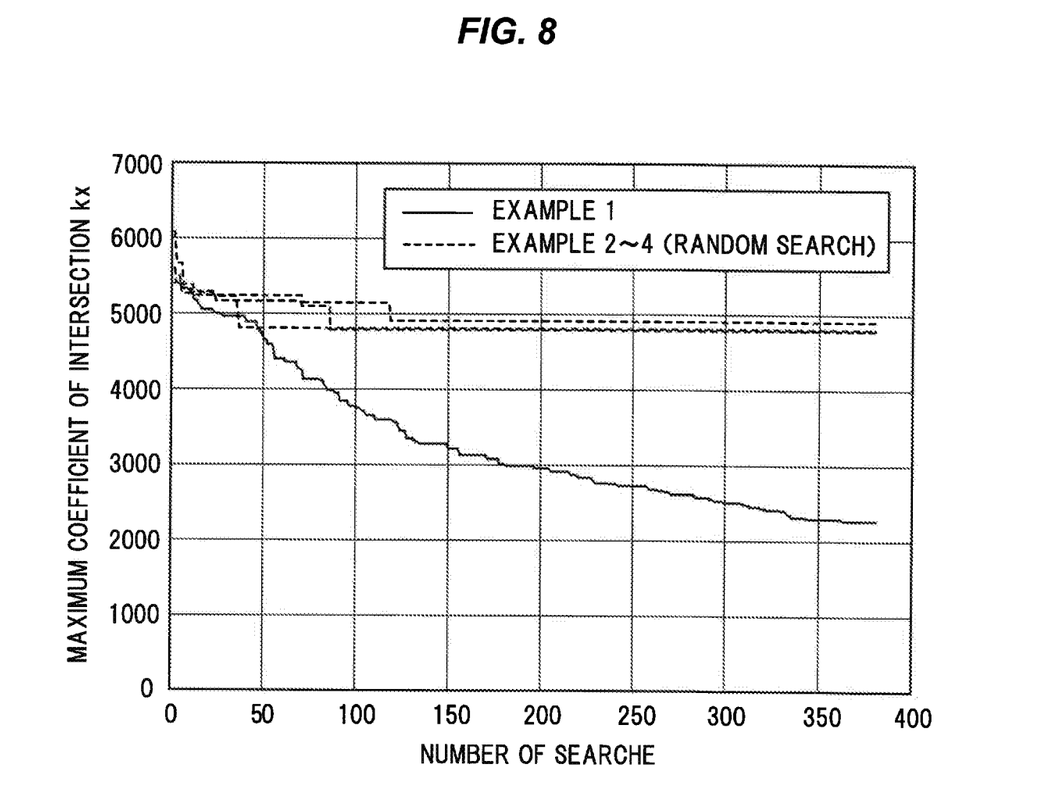
FIG. 8 is a graph showing a change in the maximum coefficient of intersection km against the number of searches.

As shown in FIG. 8, in Examples 2, 3, and 4 using the random search, it was found that the respective decreases in the maximum coefficient of intersection kx were small even when the number of searches was increased, and that a very large number of searches were required in order to make small the number of intersections between the electrical insulated wires 2. On the other hand, in Example 1 according to the present embodiment, it was found that the maximum coefficient of intersection kx was rapidly decreased as the number of searches was increased, and that the number of intersections between the electrical insulated wires 2 was able to be made small by a small number of searches.

Further, from FIG. 8, in Example 1, it was found that as the number of searches was increased, the value of the maximum coefficient of intersection kx gradually converged and lessened in its rate of change. Thus, it was found that when the rate of change dk of the maximum coefficient of intersection kx against the number of searches was equal to or smaller than the preset threshold value kt for the rate of change, by determining the connecting destinations for the plurality of electrical insulated wires 2 at that point of time on both the end portions of the multi-core cable 1 to be the respective pluralities of electrode patterns 12 for the connecting destinations for the plurality of electrical insulated wires 2, the wasteful searching was able to be eliminated so that the number of intersections between the electrical insulated wires 2 was able to be made small more efficiently.

(Actions and Advantageous Effects of the Present Embodiment)

As described above, the method for assembling the multi-core cable 1 according to the present embodiment is configured to arrange the plurality of electrical insulated wires 2 in alignment with each other on both the end portions of the multi-core cable 1 on a flat surface, then connect the respective one end portions of the plurality of electrical insulated wires 2 to the respective plurality of electrode patterns 12 of one of the circuit boards 11, then correspondingly connect the respective other end portions of the plurality of electrical insulated wires 2 to the respective plurality of electrode patterns 12, respectively, of the other of the circuit boards 11, then calculate the coefficients of intersection k for the plurality of electrical insulated wires 2 on the one end side and the other end side of the multi-core cable 1, and to iterate interchanging the connecting destinations for the respective one end portions of the plurality of electrical insulated wires 2 to the respective plurality of electrode patterns 12 of the one of the circuit boards 11, then correspondingly interchanging the connecting destinations for the respective other end portions of the plurality of electrical insulated wires 2 to the respective plurality of electrode patterns 12 of the other of the circuit boards 11, then calculating the coefficients of intersection k for the plurality of electrical insulated wires 2 on the one end side and the other end side of the multi-core cable 1, wherein the connecting destinations for the plurality of electrical insulated wires 2 to the respective pluralities of electrode patterns 12 of the circuit boards 11 are determined in such a manner that the maximum coefficient of intersection kx, which refers to either larger one of the respective coefficients of intersection k of the one end side and the other end side of the multi-core cable 1, is made small.

This makes it possible to make small the coefficients of intersection k on both the end portions, respectively, of the multi-core cable 1 in a balanced manner while suppressing the number of intersections between the electrical insulated wires 2 from becoming larger on either one of the end portions of the multi-core cable 1, for example. As a result, it is possible to suppress the plurality of electrical insulated wires 2 from becoming hard and resistant to being bent in the intersection portions caused therebetween and being liable to a wire break, and it is possible to thereby reduce the risk of the occurrence of a wire break in the plurality of electrical insulated wires 2.

In addition, according to the present embodiment, since it is possible to make small the coefficients of intersection on both the end portions, respectively, of the multi-core cable 1 in the balanced manner, it is possible to reproducibly manufacture the multi-core cable assembly 10 being small in the number of intersections on both the end portions of the multi-core cable 1, and it is possible to thereby stably produce the multi-core cable assembly 10 while suppressing variations in quality among products.

SUMMARY OF THE EMBODIMENT

Next, the technical ideas grasped from the aforementioned embodiments will be described with the aid of the reference characters and the like in the embodiments. It should be noted, however, that each of the reference characters and the like in the following descriptions is not to be construed as limiting the constituent elements in the appended claims to the members and the like specifically shown in the embodiments.

[1] A method for assembling a multi-core cable (1) being configured in such a manner as to include a plurality of electrical insulated wires (2), and a sheath (4) being provided over the plurality of electrical insulated wires (2) together, to connect the plurality of electrical insulated wires (2) to corresponding respective pluralities of electrode patterns (12) of circuit boards (11) on both end portions, respectively, of the multi-core cable (1), the method comprising: arranging the plurality of electrical insulated wires (2) in alignment with each other on both the end portions of the multi-core cable (1) on a flat surface; connecting respective one end portions of the plurality of electrical insulated wires (2) to the respective plurality of electrode patterns (12) of one of the circuit boards (11), then correspondingly connecting respective other end portions of the plurality of electrical insulated wires (2) to the respective plurality of electrode patterns (12) of an other of the circuit boards (11), then calculating with a computer coefficients of intersection (k) for the plurality of electrical insulated wires (2) on one end side and an other end side, respectively, of the multi-core cable (1); and iterating interchanging connecting destinations for the respective one end portions of the plurality of electrical insulated wires (2) to the respective plurality of electrode patterns (12) of the one of the circuit boards (11), then correspondingly interchanging connecting destinations for the respective other end portions of the plurality of electrical insulated wires (2) to the respective plurality of electrode patterns (12) of the other of the circuit boards (11), then calculating with the computer the coefficients of intersection (k) for the plurality of electrical insulated wires (2) on the one end side and the other end side, respectively, of the multi-core cable (1), wherein the connecting destinations for the plurality of electrical insulated wires (2) to the respective pluralities of electrode patterns (12) of the circuit boards (11) are determined with the computer in such a manner that a maximum coefficient of intersection (kx), which refers to either larger one of the respective coefficients of intersection (k) of the one end side and the other end side of the multi-core cable (1), is made small.

[2] The method for assembling the multi-core cable (1) as defined in the above [1], wherein, when a laying out order for the plurality of electrical insulated wires (2) in a state of being arranged in alignment with each other on the flat surface is expressed in terms of electric wire numbers N, while a laying out order for the respective plurality of electrode patterns (12) of each of the circuit boards (11) is expressed in terms of electrode numbers E, the respective coefficients of intersection (k) of the one end side and the other end side of the multi-core cable (1) are obtained by adding |E−N| together for all of the plurality of electrical insulated wires (2), then the connecting destinations for the plurality of electrical insulated wires (2) to the respective pluralities of electrode patterns (12) of the circuit boards (11) are determined with the computer in such a manner that a maximum coefficient of intersection (kx), which refers to either larger one of the respective coefficients of intersection (k) of the one end side and the other end side of the multi-core cable (1), is made small.

[3] The method for assembling the multi-core cable (1) as defined in the above [2], including sequentially iterating the steps of obtaining with the computer the maximum coefficient of intersection (kx) in an initial state in which the coefficient of intersection (k) on the one end side of the multi-core cable (1) is a minimum, thereafter on the one end side of the multi-core cable (1), transposing the connecting destinations for an i-th one of the plurality of electrical insulated wires (2), whose electric wire number N is i-th, and a j-th one of the plurality of electrical insulated wires (2), whose electric wire number N is j-th represented by the following equations:

$$j=i+h \text{ (when } i+h \leq n)$$

$$j=i+h-n \text{ (when } i+h>n),$$

where h is a variable, and n is the number of electrical insulated wires (2), obtaining with the computer the maximum coefficient of intersection (kx) in a state of the transposition of the connecting destinations, and when the obtained maximum coefficient of intersection (kx) is small as compared with before the transposition of the connecting destinations, making a decision to transpose the connecting destinations, wherein the connecting destinations for the plurality of electrical insulated wires (2) to the respective pluralities of electrode patterns (12) of the circuit boards (11) are determined with the computer by iterating the above mentioned steps while incrementing the variable h sequentially from 1.

[4] The method for assembling the multi-core cable (1) as defined in the above [3], wherein, when a rate of change (dk) of the maximum coefficient of intersection (kx) before and after the above mentioned steps becomes equal to or smaller than a preset threshold value (kt) for the rate of change, the connecting destinations for the plurality of electrical insulated wires (2) at the point of time on both the end portions of the multi-core cable (1) are determined to be the respective pluralities of electrode patterns (12) for the final connecting destinations for the plurality of electrical insulated wires (2).

[5] A method for producing a multi-core cable assembly (10), which is designed to include a multi-core cable (1) being configured in such a manner as to include a plurality of electrical insulated wires (2), and a sheath (4) being provided over the plurality of electrical insulated wires (2) together, and circuit boards (11) to be provided on both end portions, respectively, of the multi-core cable (1), each of the circuit boards (11) having each plurality of electrode patterns (12) thereon to connect with the plurality of electrical insulated wires (2), respectively, the method comprising: arranging the plurality of electrical insulated wires (2) in alignment with each other on both the end portions of the multi-core cable (1) on a flat surface; connecting respective one end portions of the plurality of electrical insulated wires (2) to the respective plurality of electrode patterns (12) of one of the circuit boards (11), then correspondingly connecting respective other end portions of the plurality of electrical insulated wires (2) to the respective plurality of electrode patterns (12) of an other of the circuit boards (11), then calculating with a computer coefficients of intersection (k) for the plurality of electrical insulated wires (2) on one end side and an other end side, respectively, of the multi-core cable (1); and iterating interchanging connecting destinations for the respective one end portions of the plurality of electrical insulated wires (2) to the respective plurality of electrode patterns (12) of the one of the circuit boards (11), then correspondingly interchanging connecting destinations for the respective other end portions of the plurality of electrical insulated wires (2) to the respective plurality of electrode patterns (12) of the other of the circuit boards (11), then calculating with the computer the coefficients of intersection (k) for the plurality of electrical insulated wires (2) on the one end side and the other end side, respectively, of the multi-core cable (1), wherein the connecting destinations for the plurality of electrical insulated wires (2) to the respective pluralities of electrode patterns (12) of the circuit boards (11) are determined with the computer in such a manner that a maximum coefficient of intersection (kx), which refers to either larger one of the respective coefficients of intersection (k) of the one end side and the other end side of the multi-core cable (1), is made small.

Although the embodiments of the present invention have been described above, the aforementioned embodiments are not to be construed as limiting the inventions according to the appended claims. Further, it should be noted that not all the combinations of the features described in the embodiments are indispensable to the means for solving the problem of the invention. Further, the present invention can be appropriately modified and implemented without departing from the spirit thereof.

Although the invention has been described with respect to the specific embodiments for complete and clear disclosure, the appended claims are not to be thus limited but are to be construed as embodying all modifications and alternative constructions that may occur to one skilled in the art which fairly fall within the basic teaching herein set forth.

What is claimed is:

1. A method for assembling a multi-core cable configured to include a plurality of electrical insulated wires, and a sheath being provided over the plurality of electrical insulated wires together, to connect the plurality of electrical insulated wires to corresponding respective pluralities of electrode patterns of circuit boards on both end portions of the multi-core cable, the method comprising:
   arranging the plurality of electrical insulated wires in alignment with each other on both the end portions of the multi-core cable on a flat surface;
   connecting respective one end portions of the plurality of electrical insulated wires to the respective plurality of electrode patterns of one of the circuit boards, then correspondingly connecting respective other end portions of the plurality of electrical insulated wires to the respective plurality of electrode patterns of an other of the circuit boards, then calculating with a computer coefficients of intersection for the plurality of electrical insulated wires on one end side and an other end side, respectively, of the multi-core cable; and
   iterating interchanging connecting destinations for the respective one end portions of the plurality of electrical insulated wires to the respective plurality of electrode patterns of the one of the circuit boards, then correspondingly interchanging connecting destinations for the respective other end portions of the plurality of electrical insulated wires to the respective plurality of electrode patterns of the other of the circuit boards, then calculating with the computer the coefficients of intersection for the plurality of electrical insulated wires on the one end side and the other end side, respectively, of the multi-core cable,
   wherein the connecting destinations for the plurality of electrical insulated wires to the respective pluralities of electrode patterns of the circuit boards are determined with the computer in such a manner that a maximum coefficient of intersection, which refers to either larger one of the respective coefficients of intersection of the one end side and the other end side of the multi-core cable, is made small.

2. The method for assembling the multi-core cable according to claim 1, wherein, when a laying out order for the plurality of electrical insulated wires in a state of being arranged in alignment with each other on the flat surface is expressed in terms of electric wire numbers N, while a laying out order for the respective plurality of electrode patterns of each of the circuit boards is expressed in terms of electrode numbers E, the respective coefficients of intersection of the one end side and the other end side of the multi-core cable are obtained by adding |E−N| together for all of the plurality of electrical insulated wires, then the connecting destinations for the plurality of electrical insulated wires to the respective pluralities of electrode patterns of the circuit boards are determined with the computer in such a manner that the maximum coefficient of intersection, which refers to either larger one of the respective coefficients of intersection of the one end side and the other end side of the multi-core cable, is made small.

3. The method for assembling the multi-core cable according to claim 2, including sequentially iterating the steps of obtaining with the computer the maximum coefficient of intersection in an initial state in which the coefficient of intersection on the one end side of the multi-core cable is a minimum, thereafter on the one end side of the multi-core cable, transposing the connecting destinations for an i-th one of the plurality of electrical insulated wires, whose electric wire number N is i-th, and a j-th one of the plurality of electrical insulated wires, whose electric wire number N is j-th represented by the following equations:

$$j=i+h \text{(when } i+h \leq n\text{)}$$

$$j=i+h-n \text{(when } i+h>n\text{)},$$

where h is a variable, and n is the number of electrical insulated wires, obtaining with the computer the maximum coefficient of intersection in a state of the transposition of the connecting destinations, and when the obtained maximum coefficient of intersection is small as compared with before the transposition of the connecting destinations, making a decision to transpose the connecting destinations, wherein the connecting destinations for the plurality of electrical insulated wires to the respective pluralities of electrode patterns, respectively, of the circuit boards are determined with the computer by iterating the above mentioned steps while incrementing the variable h sequentially from 1.

4. The method for assembling the multi-core cable according to claim 3, wherein, when a rate of change of the maximum coefficient of intersection before and after the above mentioned steps becomes equal to or smaller than a preset threshold value for the rate of change, the connecting destinations for the plurality of electrical insulated wires at the point of time on both the end portions of the multi-core cable are determined to be the respective pluralities of electrode patterns for the final connecting destinations for the plurality of electrical insulated wires.

5. A method for producing a multi-core cable assembly, which is designed to include a multi-core cable being configured in such a manner as to include a plurality of electrical insulated wires, and a sheath being provided over the plurality of electrical insulated wires together, and circuit boards to be provided on both end portions, respectively, of the multi-core cable, each of the circuit boards having each plurality of electrode patterns thereon to connect with the plurality of electrical insulated wires, respectively, the method comprising:

arranging the plurality of electrical insulated wires in alignment with each other on both the end portions of the multi-core cable on a flat surface;

connecting respective one end portions of the plurality of electrical insulated wires to the respective plurality of electrode patterns of one of the circuit boards, then correspondingly connecting respective other end portions of the plurality of electrical insulated wires to the respective plurality of electrode patterns of an other of the circuit boards, then calculating with a computer coefficients of intersection for the plurality of electrical insulated wires on one end side and an other end side, respectively, of the multi-core cable; and iterating interchanging connecting destinations for the respective one end portions of the plurality of electrical insulated wires to the respective plurality of electrode patterns, respectively, of the one of the circuit boards, then correspondingly interchanging connecting destinations for the respective other end portions of the plurality of electrical insulated wires to the respective plurality of electrode patterns of the other of the circuit boards, then calculating with the computer the coefficients of intersection for the plurality of electrical insulated wires on the one end side and the other end side, respectively, of the multi-core cable, wherein the connecting destinations for the plurality of electrical insulated wires to the respective pluralities of electrode patterns of the circuit boards are determined with the computer in such a manner that a maximum coefficient of intersection, which refers to either larger one of the respective coefficients of intersection of the one end side and the other end side of the multi-core cable, is made small.

* * * * *